(12) United States Patent
Kim et al.

(10) Patent No.: US 8,798,674 B2
(45) Date of Patent: Aug. 5, 2014

(54) MOBILE TERMINAL

(75) Inventors: Kyungjong Kim, Gyeonggi-Do (KR); Youngwoo Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 39 days.

(21) Appl. No.: 12/948,488

(22) Filed: Nov. 17, 2010

(65) Prior Publication Data

US 2011/0281617 A1 Nov. 17, 2011

(30) Foreign Application Priority Data

May 14, 2010 (KR) ........................ 10-2010-0045192

(51) Int. Cl.
*H04M 1/00* (2006.01)

(52) U.S. Cl.
USPC ....... 455/556.1; 455/90.3; 455/557; 343/870; 343/873

(58) Field of Classification Search
USPC .................. 455/90.3, 556.1, 557, 566, 575.7; 343/870, 873, 896, 906–908
See application file for complete search history.

(56) References Cited

U.S. PATENT DOCUMENTS

| | | | | |
|---|---|---|---|---|
| 5,739,793 | A * | 4/1998 | Adachi | 343/702 |
| 8,019,096 | B2 * | 9/2011 | Sander et al. | 381/123 |
| 2008/0084834 | A1 * | 4/2008 | Stanek | 370/284 |
| 2009/0073056 | A1 | 3/2009 | Hsin | |

FOREIGN PATENT DOCUMENTS

| | | |
|---|---|---|
| CN | 1770551 | 5/2006 |
| CN | 101072249 | 11/2007 |
| CN | 20116018 Y | 12/2008 |
| EP | 0 784 353 A1 | 7/1997 |
| JP | 58-219801 | 12/1983 |
| WO | WO 2010/022801 | 3/2010 |

OTHER PUBLICATIONS

European Search Report dated Feb. 25, 2011 for Application 11000059.3.
Chinese Office Action dated Mar. 13, 2013 for Application 201010621695.7.
Chinese Office Action for Application 201010621695.7 dated Oct. 10, 2013 and English language translation.

* cited by examiner

*Primary Examiner* — Tuan H Nguyen
(74) *Attorney, Agent, or Firm* — KED & Associates LLP

(57) ABSTRACT

Disclosed is a mobile terminal comprising: a terminal body having a touch screen; an audio jack mounted to one side of the terminal body, and connected to an audio output device; and an antenna device detachably mounted to the audio jack, wherein the antenna device includes: an antenna body implemented in the form of a rod having a predetermined length; a connector formed atone end of the antenna body so as to be inserted into the audio jack, and including one or more feeding terminals; and a touch tip provided at an end of the connector, and configured to manipulate the touch screen.

21 Claims, 8 Drawing Sheets

MOBILE TERMINAL

CROSS-REFERENCE TO A RELATED APPLICATION

Pursuant to 35 U.S.C. §119(a), this application claims the benefit of earlier filing date and right of priority to Korean Application No. 10-2010-0045192, filed on May 14, 2010, the contents of which are hereby incorporated by reference herein in their entirety.

BACKGROUND OF THE INVENTION

1. Field of the Invention

The present invention relates to a mobile terminal, and particularly, to a mobile terminal having an external antenna device.

2. Background of the Invention

A mobile terminal is a device that can be carried around and has one or more functions such as voice and video call communication, inputting and outputting information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions of such multimedia players or devices, the multimedia player requires sufficient support in terms of hardware or software, for which numerous attempts are being made and implemented. For example, a user interface allowing users to easily and conveniently search for and select one or more functions is provided. In order to provide a convenient user interface and a simpler and slimmer appearance, the mobile terminal may adopt an input method by touch. Furthermore, a supplementary tool such as a 'stylus' may be implemented so as to overcome disadvantages due to touch input by a user's finger.

The number of wireless services provided through a mobile terminal is being increased. For instance, the wireless services include cellular mobile communications, digital broadcasting, short distance communications such as Bluetooth, ultrahigh speed data communications, etc. In case of the digital broadcasting, an antenna for receiving broadcasting through a terrestrial wave has to have a sufficient physical length for resonance since it uses a long wave.

A stylus and an antenna for receiving a terrestrial wave have a difficulty in is being mounted in a mobile terminal as the mobile terminal becomes light and slim recently. Therefore, each of the stylus and the antenna may be on the market or may be dealt in the form of a separate component of the mobile terminal.

However, mounting the stylus and the antenna for receiving a terrestrial wave to the mobile terminal may cause a user's inconvenience, and may not be preferable in the aspect of utilization of resources and a space.

SUMMARY OF THE INVENTION

Therefore, an object of the present invention is to provide a mobile terminal having dual functions for a stylus and an antenna for receiving a terrestrial wave.

Another object of the present invention is to provide a mobile terminal capable of allowing a means for connecting a terrestrial wave receiving antenna to the mobile terminal, to be plugged in a conventional connector.

To achieve these and other advantages and in accordance with the purpose of the present invention, as embodied and broadly described herein, there is provided a mobile terminal, comprising: a terminal body having a touch screen; an audio jack mounted to one side of the terminal body, and connected to an audio output device; and an antenna device detachably mounted to the audio jack, wherein the antenna device includes an antenna body implemented in the form of a rod having a predetermined length; a connector formed at one end of the antenna body so as to be inserted into the audio jack, and including one or more feeding terminals; and a touch tip provided at an end of the connector, and configured to manipulate the touch screen.

The terminal body may further include a recognition device configured to recognize whether a connector of the audio output device or the connector of the antenna device has been connected to the mobile terminal.

The audio jack may include an MIC terminal, a ground terminal and left and right signal terminals, and the feeding terminal of the connector may be connected to the ground terminal.

The recognition device may include a first comparator configured to output a first comparison value indicating a resultant value obtained by comparing a first preset voltage with a voltage of the MIC terminal; and a second comparator configured to output a second comparison value indicating a resultant value obtained by comparison a second preset voltage higher than the first preset voltage with the voltage of the MIC terminal, wherein whether the connector of the audio output device or the connector of the antenna device has been connected to the audio jack is recognized based on contents corresponding to the first comparison value and the second comparison value and selected form a preset combination list.

The first preset voltage may be set to be lower than a voltage when a microphone is normally operated, thus to be connected to a (+) input terminal of the first comparator, whereas the second preset voltage may be set to be higher than the voltage when the microphone is normally operated, thus to be connected to a (+) input terminal of the second comparator.

The feeding terminal of the connector may be connected to a shunt inductor so as to be separated from a ground of the terminal body.

The connector may be formed in a shape corresponding to a size of the audio jack. And, the connector may include a first connector body formed of a conductive material and connected to the antenna body by a hinge; a second connector body formed of a conductive material, mounted at a head portion of the first connector body so as to be electrically connected to the first connector body, and configured to form the feeding terminal; and a third connector body formed of a conductive material, mounted at a head portion of the second connector body so as to be insulated from the second connector body, and having a mounting hole at an end thereof so as to fix the touch tip.

A first insulator may be further provided on one of a plurality of outer circumferential surfaces of the second connector body so as to contact the MIC terminal.

A second insulator may be disposed between the second connector body and the third connector body, thereby insulating the second connector body and the third connector body from each other.

The third connector body may have a length long enough to contact both of the left and right signal terminals.

Telescopic sub-rods may be provided at the antenna body.

The antenna device may be formed so as to be coupled to the antenna body, and may further include a cap configured to cover the connector and the touch tip when the antenna device is not used.

The cap may be formed so as to extend the antenna body in the form of a straight line.

The connector may be configured so as to be accommodated in the antenna body by a length long enough for the hinge to be inserted into the antenna body.

According to another aspect of the present invention, there is provided a mobile terminal, comprising: a terminal body having a touch screen; an audio jack mounted to one side of the terminal body, and configured to be connected to an audio output device; an antenna device detachably mounted to the audio jack, formed so as to be used as a broadcast receiving antenna when mounted to the audio jack, and formed to manipulate the touch screen when separated from the audio jack; and a recognition device configured to recognize whether a connector of the audio output device or a connector of the antenna device has been connected to the audio jack.

To achieve these and other advantages and in accordance with the purpose of the present invention, as embodied and broadly described herein, there is also provided a method for recognizing whether an audio output device or an antenna device has been connected to a mobile terminal, the audio output device mounted to one side of a terminal body and connected to an audio jack, the method comprising: comparing a first preset voltage with a voltage of an MIC terminal included in the audio jack; comparing a second preset voltage higher than the first preset voltage with the voltage of an MIC terminal; and determining whether a connector of the audio output device or a connector of the antenna device has been connected to the audio jack based on contents corresponding to the first comparison value and the second comparison value and selected from a preset combination list.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

For the sake of brief description with reference to the drawings, the same or equivalent components will be provided with the same reference numbers, and description thereof will not be repeated.

A mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

Figure 1:
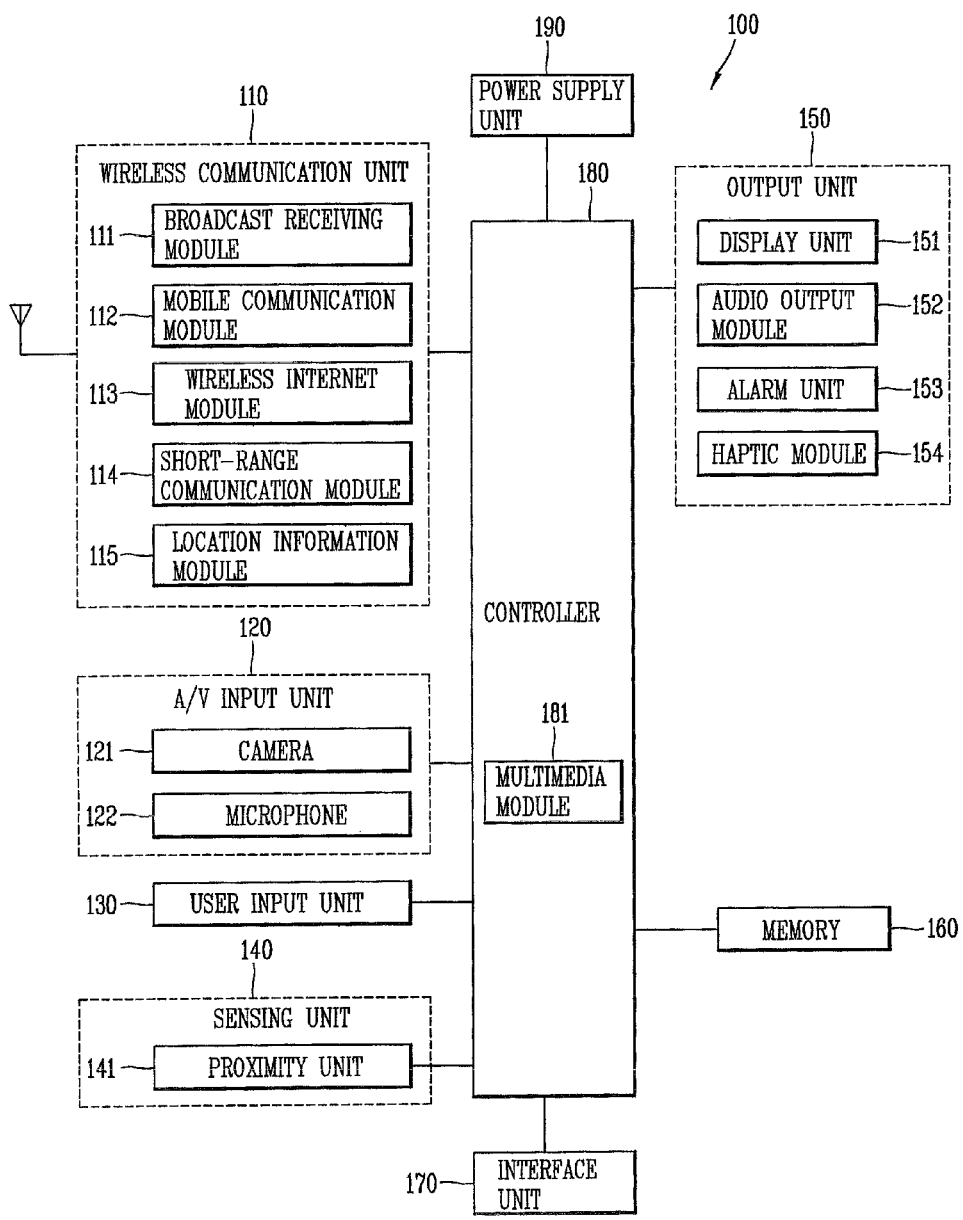
FIG. 1 is a block diagram of a mobile terminal according to the present invention.

FIG. 1 is a block diagram of a mobile terminal according to the present invention.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood rat implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing server via a broadcast channel. The broadcast channel may include a satellite channel and a terrestrial channel. Especially, an antenna device for receiving a terrestrial wave channel according to the present invention will be explained in more detail with reference to FIG. 2. The broadcast managing server may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like.

The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits and receives radio signals to and from at least one of a base station, an external terminal and a server. Such radio signals may include a voice call signal, a video call signal or various types of data according to text/multimedia message transmission and reception.

The wireless Internet module 113 refers to a module for a wireless Internet access. This module may internally or externally coupled to the terminal. The wireless Internet technique may include a WLAN (Wireless LAN) (Wi-Fi), Wibro (Wireless broadband), Wimax (World Interoperability for Microwave Access), HSDPA (High Speed Downlink Packet Access), etc.

The short-range communication module 114 refers to a module for short-range communication. As the short range communication technologies, Bluetooth, radio frequency identification (RFID), infrared data association (IrDA), ultra-wideband (UWB), ZigBee, etc., may be used.

The location information module 115 is a module for checking or acquiring a location (or position) of the portable terminal. A typical example of the location information module is a GPS (Global Positioning System).

The A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory unit 160 or transmitted via the wireless communication unit 110. Two or more cameras 121 may be provided according to the configuration of the portable terminal.

The microphone 122 may receive sounds (audible data) via a microphone or the like in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the portable terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 detects a current status (or state) of the portable terminal 100 such as an opened or closed state of the portable terminal 100, a location of the portable terminal 100, the presence or absence of user contact with the portable terminal 100 (i.e., touch inputs), the orientation of the portable terminal 100, an acceleration or deceleration movement and direction of the portable terminal 100, etc., and generates commands or signals for controlling the operation of the portable terminal 100. For example, when the portable terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. Meanwhile, the sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the portable terminal 100. For example, when the portable terminal 100 is in a phone call mode, the display unit 151 may display a User Interface (UI) or a Graphic User Interface (GUI) associated with a call. When the portable terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of such displays 151 may be implemented as a transparent type or is an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the portable terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on. A mechanical structure of the speaker regarding the present invention will be explained later in more detail.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the portable terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card imcro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, is optical disk, and the like. Also, the portable terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit 170 may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180.

Figure 2:
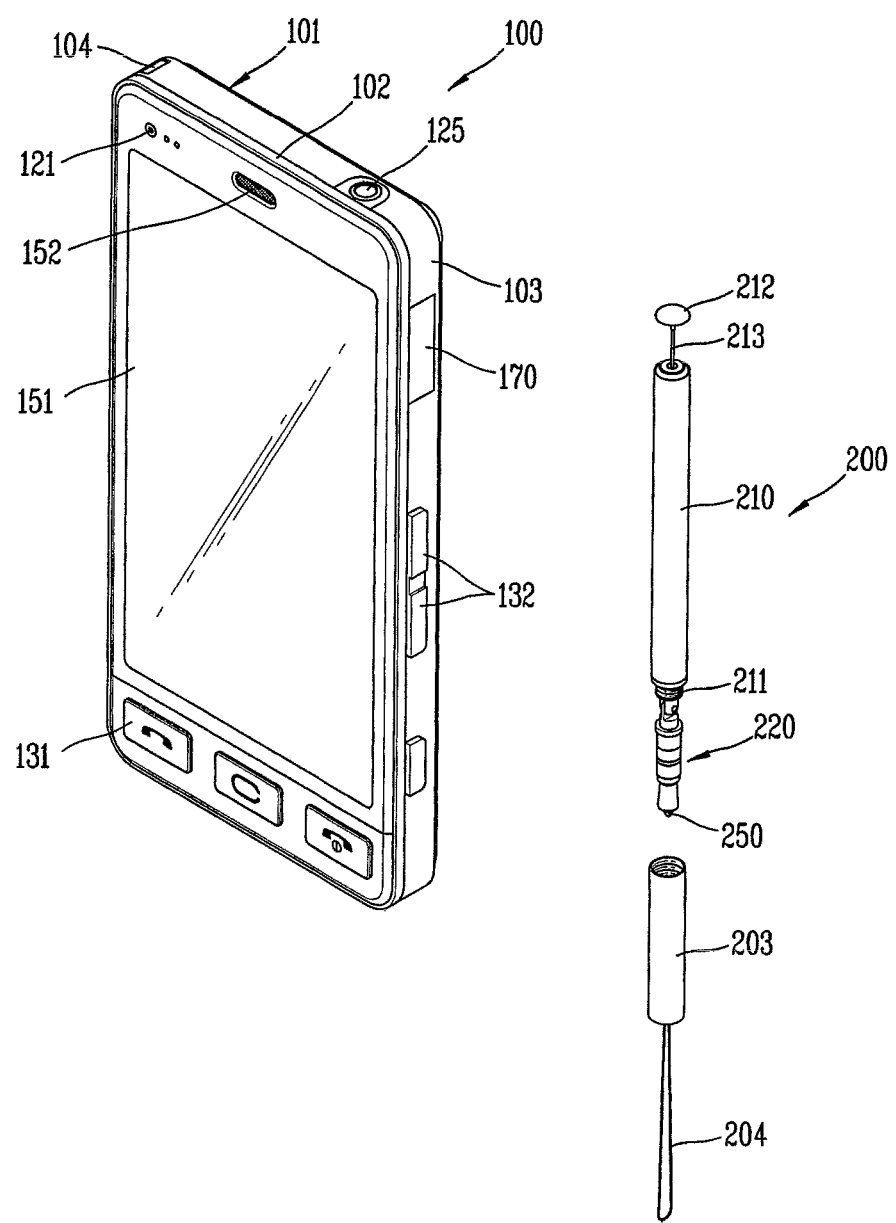
FIG. 2 is a front perspective view of the mobile terminal according to the present invention.

FIG. 2 is a front perspective view of the portable terminal in accordance with the present invention.

The portable terminal 100 described is provided with a bar type of terminal body 101. However, the present invention is not limited to this type, but applicable to various configurations, such as a slide type that two or more bodies are coupled to each other so as to be relatively moved, a folder type, a swing type, a swivel type and the like.

The terminal body 101 includes a case (casing, housing, cover, etc.) which forms an outer appearance. The case may be classified into a front case 102 and a rear case 103. A space formed by the front case 102 and the rear case 103 may accommodate various components therein. At least one intermediate case may further be disposed between the front case 102 and the rear case 103. Such cases may be formed by injection-molded synthetic resin, or may be formed using a metallic material such as stainless steel (STS) or titanium (Ti).

A display unit 151, an audio output module 152, an image input unit 121, a first user input unit 131, an audio input unit 122, etc. may be disposed on a front is surface of the terminal body 101.

The display unit 151 includes a liquid crystal display (LCD) module for visually displaying information, an organic light emitting diode (OLED) module, an e-paper, and the like. The display unit 151 may include a touch sensing unit allowing for an inputting operation in a touch manner. In this case, as aforementioned, the display unit 151 may be referred to as a 'touch screen'. Thus, when a point on the display unit 151 is touched, content corresponding to the touched position is inputted. The content inputted in the tactile manner may be characters, numbers, menu items that can be indicated or designated in various modes, and the like. The touch sensing unit is formed to be transparent so that the display unit 151 can be viewed. And, the touch sensing unit may include a structure to enhance visibility of the touch screen at a bright place.

The audio output module 152 may be implemented in the form of a receiver that outputs a call sound, or in the form of a loud speaker that outputs various system alarm sounds or multimedia reproduction sounds. The receiver or the loud speaker may be implemented as a dynamic speaker, or may be operated in a bone conduction manner.

The user input unit is configured to receive a command for controlling the operation of the mobile terminal 100. Referring to FIG. 2, the user input unit includes a first user input unit 131 disposed on a front surface of the terminal body 101, and a second user input unit 132 disposed on a side surface of the terminal body 101. The first and second input units 131 and 132 may be referred to as 'manipulating portions', and may adopt any components which allow a user to manipulate in a tactile manner.

Contents inputted by the first user input unit 131 or the second user input unit 132 may be set in a various manner. For instance, the first user input unit 131 may receive commands such as 'START', 'END' and 'SCROLL', and the second user input unit 132 may receive commands such as a command for controlling a level of a sound outputted from the audio output unit 152, or a command for converting a current mode of the display unit 151 into a touch recognition mode.

The audio input unit 122 may be implemented as a microphone to receive a user's voice or other sound, etc.

The image input unit 121 may be implemented as a camera for capturing a still image or a moving image with respect to a user or any object. Furthermore, the image input unit 121 may be used as a means to detect or recognize an object. Referring to FIG. 2, the image input unit 121 is disposed on a front surface of the terminal body 101. Here, the image input unit 121 may be also disposed on a rear surface of the terminal body 101.

An input/output port 170, an audio jack 125, etc. are disposed on side surfaces of the terminal body 101.

The input/output port 170 serves as a passage through which the mobile terminal 100 of the present invention exchanges data, etc. with an external device. For instance, the input/output port 170 may include at least one of wired/wireless terminals to be connected to earphones, short-range communication ports (e.g., IrDA port, Bluetooth port, and wireless LAN port), and a power supply terminal for supplying power to the mobile terminal 100. Also, the input/output port 170 may be implemented as a card socket (e.g., for coupling to a memory card, subscriber identity module (SIM) card, and user identity module (UIM) card). This input/output port 170 may have various sizes according to a manufacturer's selection.

Figure 8:
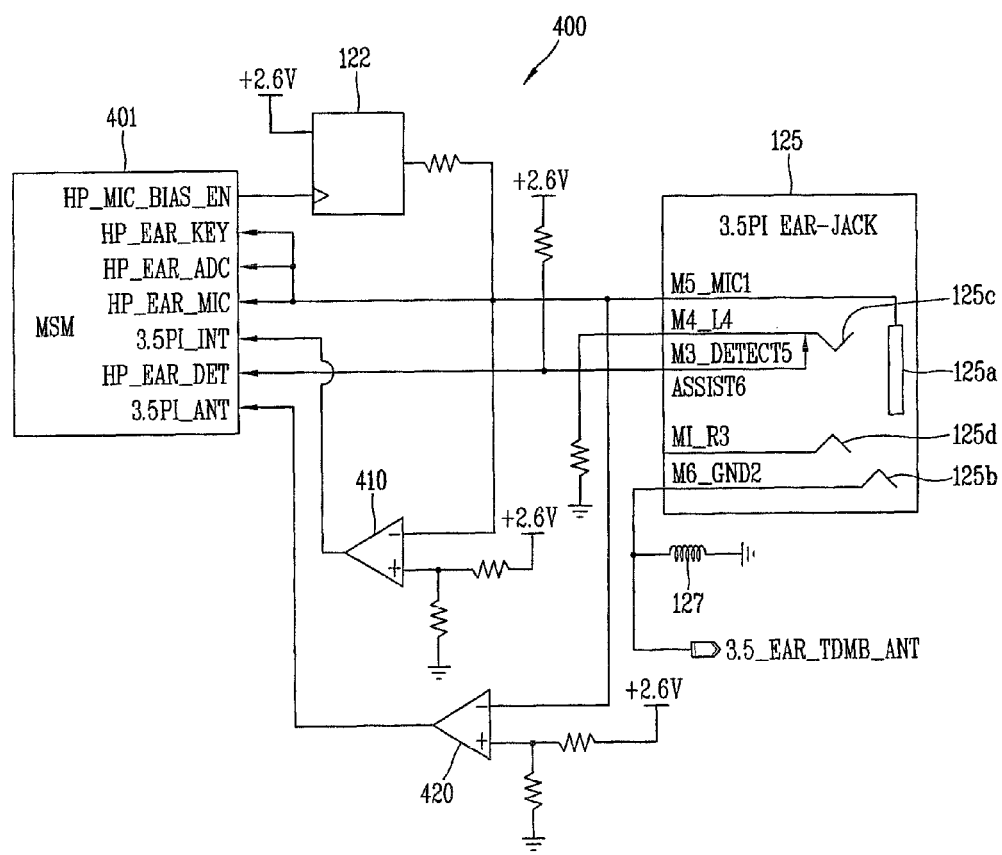
FIG. 8 is a circuit diagram conceptually showing a recognition device configured to recognize whether the connector of the antenna device or a connector of a general audio device has been inserted into an audio jack.

Differently from the input/output port 170, the audio jack 125 is a means to which an audio accessory (e.g., headset or earset or handsfree device, etc.) is connected, and may be disposed at one side of the terminal body 101. The audio jack 125 may be categorized into several types according to its size. The audio jack 125 disclosed in the present invention is a socket type audio jack to which a plug having a diameter of 3.5 mm can be inserted, which is being used the most. However, the present invention may be also applicable to a mobile terminal to which an audio jack having other diameter rather than 3.5 mm has been mounted. As shown in FIG. 8, this audio jack 125 includes an MIC terminal 125a, a ground terminal 125b, and left and right signal terminals 125c and 125d.

An antenna device 200 for compatible use as a stylus may be connected to the audio jack 125. This antenna device 200 may be dealt as an accessory of the mobile terminal 100, and may include a cap 203 connected to a string 204 so as to hang on a connection ring 104 formed at one side of the mobile terminal 100. A thread 211 may be formed at the antenna device 200 for coupling of the cap 203 with an antenna body 210. The cap 203 is formed so as to cover a connector 220 of the antenna device 200 when the antenna device 200 is not used, and is formed so as to extend the antenna body 210 in the form of a straight line.

Referring to FIG. 2, the antenna device 200 includes an antenna body 210, a connector 220, and a touch tip 250 mounted at the end of the connector 220. The antenna body 210 is formed of conductive metal, and serves as a handgrip for a stylus. One or more telescopic sub-rods 213 having a length suitable to receive a terrestrial wave broadcast band are provided at the antenna body 210. A handgrip 212 configured to facilitate withdrawal (pulling) of the sub-rod 213 is provided at the end of the sub-rod 213.

The connector 220 is extending from one end of the antenna body 210, and is formed in a shape corresponding to a size of the audio jack 125 so as to be inserted into the audio jack 125. This connector 220 includes one or more feeding terminals so that a broadcast signal received through the antenna body 210 and the sub-rod 213 can be fed. The feeding terminal of the connector 220 is configured to be connected to the ground terminal of the audio jack 125.

The touch tip 250 mounted at the end of the connector 220 is provided at the end of the connector, and is formed to have a sharp end so as to manipulate the touch screen 151. The touch tip 250 allows a user to use the antenna device 200 as a stylus with grasping the antenna device 200 even in a state that the antenna device 200 is not connected to the audio jack 125.

Since the audio jack 125 is commonly connected to a general audio accessory (headset or handsfree device) and the antenna device 200, the mobile terminal 100 can provide various user interfaces.

Figure 3:
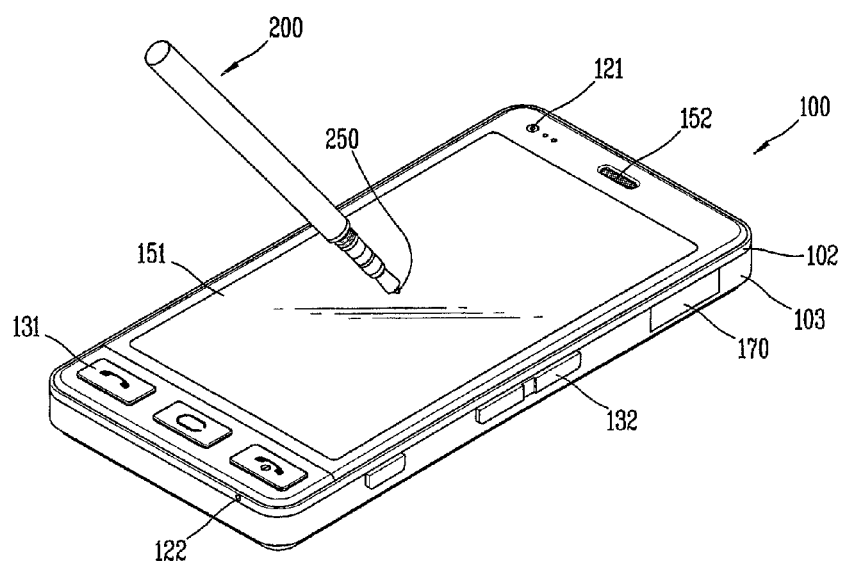
FIGS. 3 to 5 are views showing examples to utilize an antenna device in a mode of the mobile terminal according to the present invention.
Figure 4:
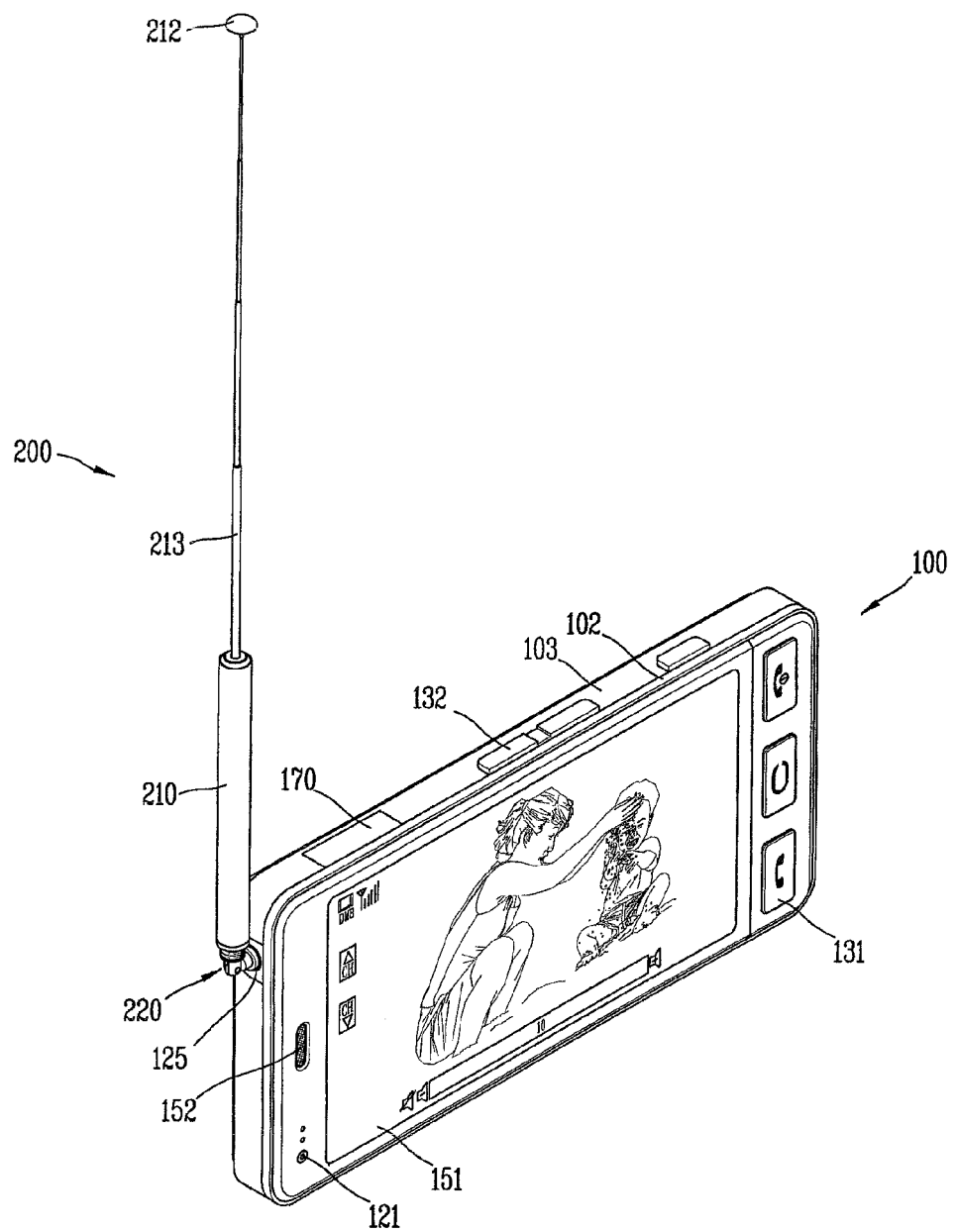
Figure 5:
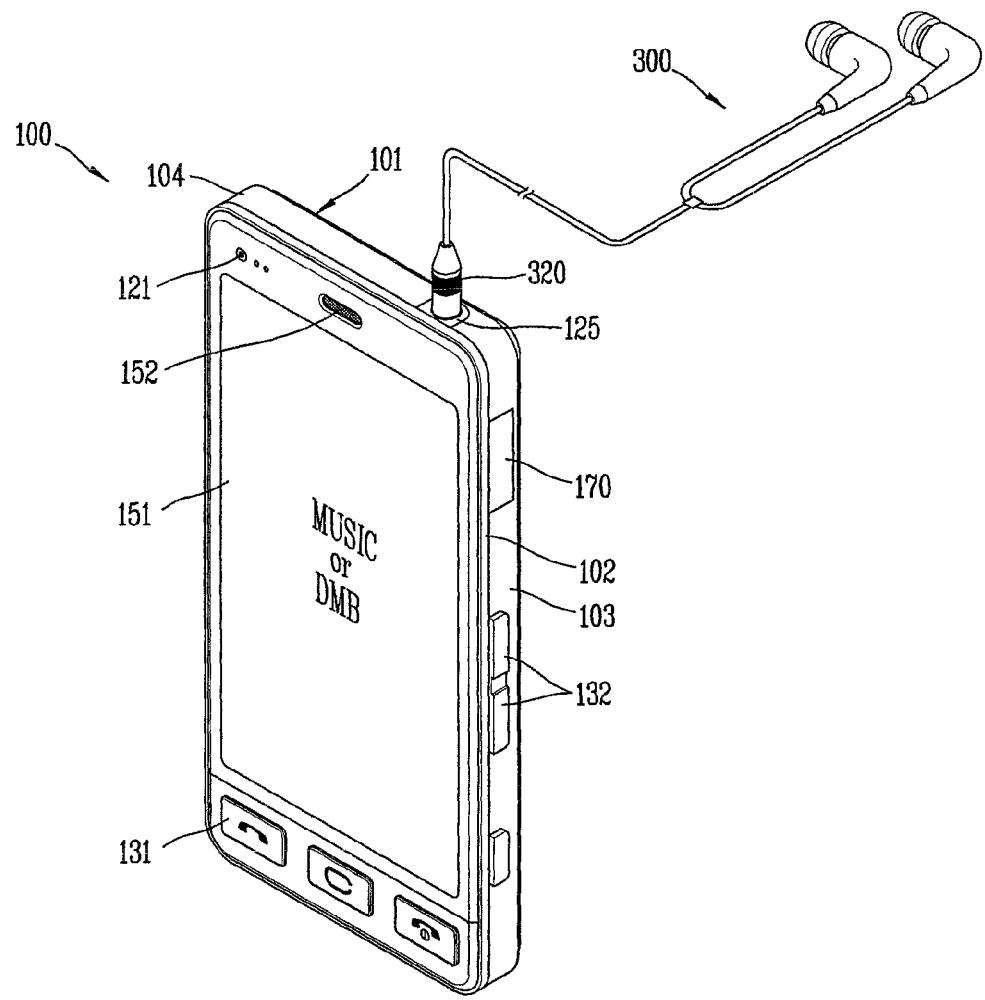

FIGS. 3 to 5 are views showing user interfaces.

FIG. 3 shows a state that the antenna device 200 of the present invention is utilized as a stylus for manipulating the touch screen 151. In a case that the touch screen 151 is implemented as a static pressure type, the antenna device can be utilized very effectively to enable sophisticated searches and inputs. In case of utilizing the antenna device 200 as a stylus, it is important to connect the antenna device to the mobile terminal 100 as an accessory device. Since the antenna device 200 is always in a connected state to the mobile terminal 100 by a connection strip 204, it can be easily used whenever and wherever if necessary.

Referring to FIG. 4, in a state that the antenna device 200 has been separated from the cap 203, the connector 220 (or a plug) of the antenna device 200 is inserted into the audio jack 125, and the antenna device 200 is drawn out (pulled out), thereby receiving a terrestrial wave broadcast signal. The antenna device 200 has a physical length corresponding to a bandwidth for receiving a terrestrial wave broadcast signal, e.g., a bandwidth of about 170~210 MHz in Korea.

The touch screen 151 may provide a user interface for selecting broadcast contents, switching one channel into another channel, or controlling a volume while the antenna device 200 is being used.

In case of inserting the antenna device 200 into the audio jack 125, sound included in broadcast may be output from the audio output module 152 of the mobile terminal 100. The output may be automatically performed by a preset method, or may be set by a user's selection.

Referring to FIG. 5, a headset or an earset device 300 may be connected to the audio jack 125. The headset or the earset device 300 may be configured to be also used as an antenna for receiving a terrestrial wave broadcast signal. In this case, the audio output module 152 mounted to the terminal body 101 may be configured to automatically have limited sound output when a plug 320 of the headset or the earset device 300 has been inserted into the audio jack 125.

FIGS. 6A to 6E are views showing a plurality of usage states of the antenna device 200 according to the present invention.

Figure 6A:
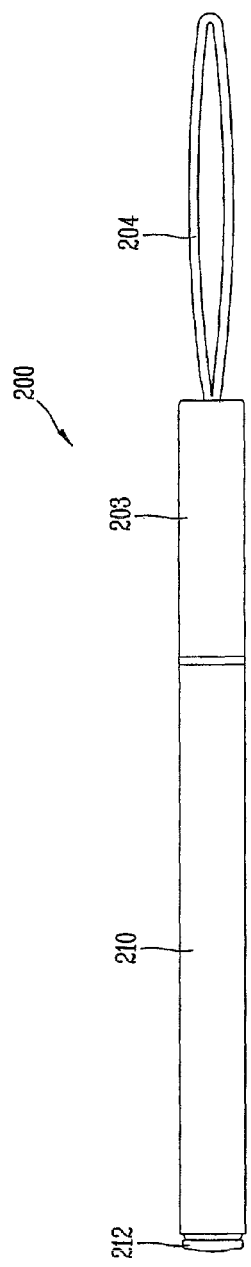
FIGS. 6A to 6E are views showing operational states of the antenna device according to the present invention.

As shown in FIG. 6A, in a state that the cap 203 has been coupled to the antenna device 200, the antenna device 200 may be used as an accessory of the mobile terminal 100. The cap 203 extends the antenna device 200 in the form of a straight line, and entirely has a rod shape.

Figure 6B:
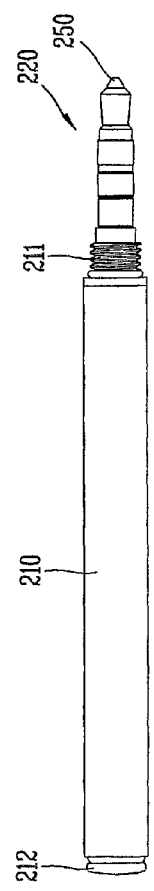

As shown in FIG. 6B, once the cap 203 has been separated from the antenna device 200, the connector 220 and the touch tip 250 of the antenna device 200 are exposed to outside.

Figure 6C:
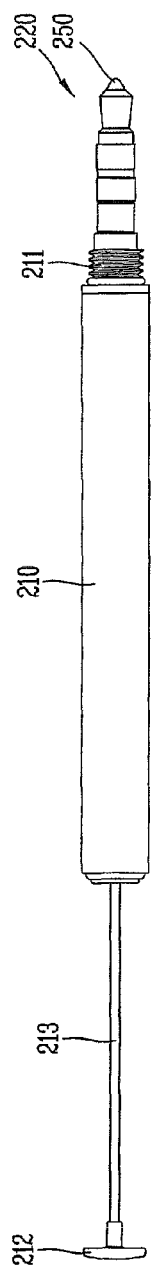

As shown in FIG. 6C, in case of using the antenna device, the sub-rod 213 may be drawn out of the antenna body 210 by using the handgrip 212.

Figure 6D:
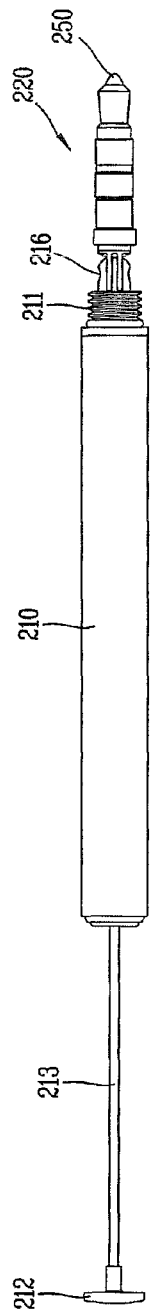

The connector 220 may be accommodated into the antenna body 210 by a predetermined depth, and a hinge 216 is exposed to outside when the connector 220 is pulled out (drawn out) a little as shown in FIG. 6D.

Figure 6E:
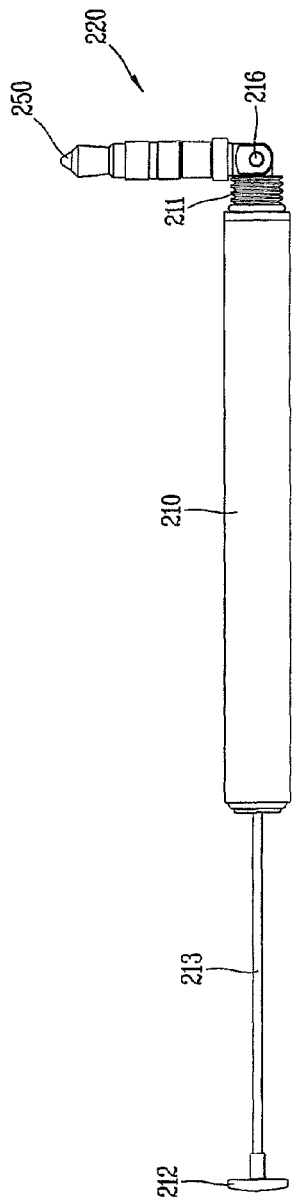

As shown in FIGS. 6E and 4, the antenna body 210 is connected to the connector 220 inserted into the audio jack 125 by the hinge 216. Accordingly, the antenna body 210 may be configured to be toward the terminal body 101 in a plurality of directions.

Figure 7:
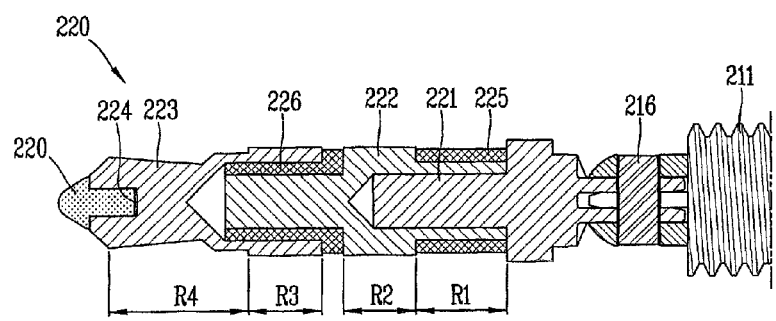
FIG. 7 is a sectional view showing a detailed configuration of a connector of the antenna device according to the present invention.

FIG. 7 is a sectional view showing a detailed configuration of the connector 220 of the antenna device 200 according to the present invention.

As shown in FIG. 6, the connector 220 is formed in a shape corresponding to a size of the audio jack 125. More concretely, the connector 220 includes a first connector body 221 formed of a conductive material and connected to the antenna body 210 by the hinge 216, a second connector body 222 mounted at a head portion of the first connector body 221 so as to be electrically connected to the first connector body 221, and a third connector body 223 mounted at a head portion of the second connector body 222 so as to be insulated from the second connector body 222.

A first insulator 225 is mounted on one of a plurality of outer circumferential surfaces of the second connector body 222 fitted into the first connector body 221. The first insulator 225 provides a first section (R1) where the MIC terminal 125a of the audio jack 125 can contact the first insulator 225. In order to facilitate mounting of the first insulator 225, the second connector body 222 is separately fabricated from the first connector body 221, and is assembled to the first connector body 221. However, the second connector body 222 may be integrally formed with the first connector body 221, and then may be mounted with the first insulator 225.

Another outer circumferential surface among a plurality of outer circumferential surfaces of the second connector body 222 provides a second section (R2) to which the ground terminal of the audio jack 125 can contact. The second connector body 222 is in a state electrically connected to the first connector body 221, and an electric signal received through the antenna body 210 is fed to the ground terminal 125b of the audio jack 125.

A second insulator 226 is provided between the second connector body 222 and the third connector body 223. That is, in a state that the second insulator 226 has been mounted to a head portion of the second connector body 222, the second connector body 222 is inserted into the third connector body 223. Accordingly, the third connector body 223 is insulated from the second connector body 222. A mounting hole 224 for mounting the touch tip 250 is formed at the end of the third connector body 223. The third connector body 223 is formed to have a length long enough to include sections R3 and R4 to which the left and right signal terminals of the audio jack 125 can contact.

Under this configuration, even if the connector 220 of the antenna device 200 has been inserted into the audio jack 125, the third connector body 223 is floated from the second connector body 222. Accordingly, no signal is provided to the left and right signal terminals of the audio jack 125 (non-connected state).

FIG. 8 is a circuit diagram conceptually showing a recognition device configured to recognize whether the connector of the antenna device or a is connector of a general audio device has been inserted into the audio jack.

As aforementioned, the audio jack 125 includes an MIC terminal 125a, a ground terminal 125b, and left and right signal terminals 125c and 125d.

The ground terminal 125b to which the feeding terminal of the connector 220 of the antenna device 200 is connected is configured to be connected to a shunt inductor 127, so as to be separated from a ground of the terminal body 101 when the antenna device 200 is used.

The terminal body 101 includes a recognition device 400 configured to recognize whether the connector of the audio output device 300 or the connector 220 of the antenna device 200 has been connected to the audio jack 125. Referring to FIG. 7, the recognition device 400 includes two comparators, i.e., a first comparator 410 and a second comparator 420.

The first comparator 410 outputs a first comparison value indicating a resultant value obtained by comparing a first preset voltage with a voltage of the MIC terminal 125a. Referring to FIG. 8, the first preset voltage is 0.22V, and is connected to a (+) input terminal of the first comparator 410. And, the voltage of the MIC terminal 125a is connected to a (−) input terminal of the first comparator 410. The first comparison value outputted from the first comparator 410 is indicated as a high voltage when the voltage of the MIC terminal 125a is smaller than the first preset voltage, 0.22V. On the other hand, the first comparison value outputted from the first comparator 410 is indicated as a low voltage when the voltage of the MIC terminal 125a is larger than the first preset voltage, 0.22V.

The second comparator 420 outputs a second comparison value indicating a resultant value obtained by comparing a second preset voltage with a voltage of the MIC terminal 125a. Referring to FIG. 8, the second preset voltage is 1.54V, and is connected to a (+) input terminal of the second comparator 420. And, the voltage of the MIC terminal 125a is connected to a (−) input terminal of the second comparator 420. The second comparison value outputted from the second comparator 420 is indicated as a high voltage when the voltage of the MIC terminal 125a is smaller than the second preset voltage, 1.54V. On the other hand, the second comparison value outputted from the second comparator 420 is indicated as a low voltage when the voltage of the MIC terminal 125a is larger than the second preset voltage, 1.54V.

In an assumption that that a voltage when a microphone is normally operated is in the range of +1.1V~+1.3V, the first preset voltage is lower than the voltage, whereas the second preset voltage is higher than the voltage.

An HP_EAR_KEY of an MSM 401 represents a voltage of the MIC terminal 125a of the audio jack 125. And, an HP_EAR_DET outputs a high signal or a low signal according to whether either a connector or a plug has been inserted into the audio jack 125.

Under this configuration, the recognition device 400 may predict a scenario such as the following table 1 according to an object inserted into the audio jack 125. Here, the 3.5PI_INT indicates the first comparison value, and the 3.5PI_ANT indicates the second comparison value.

TABLE 1

| Scenario | Recognition voltage (v) | | Combination of first comparison value and second comparison value |
|---|---|---|---|
| | HP_EAR_DET | HP_EAR_KEY | |
| Null | L | — | Disregard (Neglect) |
| Plug for three-terminal earphone | H | 0 V~+0.1 V | 3.5PI_INT:H, 3.5PI_ANT:H |
| Plug for four-terminal earphone | H | +1.1 V~+1.3 V | 3.5PI_INT:L, 3.5PI_ANT:H |
| Connector of antenna device | H | +1.6 V~+1.7 V | 3.5PI_INT:L, 3.5PI_ANT:L |

The recognition device 400 is configured to recognize whether a plug of an audio output device 300, or the connector 220 of the antenna device has been connected to the audio jack 125 based on contents corresponding to the first comparison value and the second comparison value and selected from a preset combination list. If no plug is inserted into the audio jack 125, the HP_EAR_DET is outputs a low signal, and the mobile terminal maintains a default state.

If a plug for a three-terminal earphone is inserted into the audio jack 125, a part of the plug contacting the MIC terminal 125a is connected to the ground terminal 125b. Therefore, the HP_EAR_KEY is detected as a low voltage of 0 V~+0.1V. Here, both of the first comparison value and the second comparison value are in a high state (H).

If a plug for a four-terminal earphone is inserted into the audio jack 125, the plug is provided with an additional terminal contacting the MIC terminal 125a. Here, the HP_EAR_KEY is detected as a voltage of +1.1V~+1.3V. The first comparison value is in a low state (L), whereas the second comparison value is in a high state (H).

In a case that the connector 220 of the antenna device 200 is inserted into the audio jack 125, the connector 220 is not provided with a terminal contacting the MIC terminal 125a. Therefore, the HP_EAR_KEY is detected as a voltage of +1.6V~+1.7V which is a little lower than +1.8V set to the microphone. Here, both of the first comparison value and the second comparison value is in a low state (L).

Through combinations of the first comparison value (3.5PI_INT) and the second comparison value (3.5PI_ANT), it can be recognized whether the plug (more concretely, the plug for a three-terminal earphone and the plug for a four-terminal earphone), and the connector 220 of the antenna device have been inserted into the audio jack 125.

When the plug for a three-terminal earphone, the plug for a four-terminal earphone, and the connector 220 of the antenna device have been inserted into the audio jack 125, the touch screen 151 may provide a user interface. For instance, when the connector 220 of the antenna device 200 has been inserted into the audio jack 125, a guide pop up inquiring whether to output a received broadcast image may be outputted to the touch screen 151.

In the mobile terminal according to the present invention, a signal received by the antenna device is fed by the audio jack. Therefore, an additional port or connector for feeding the antenna device is not required. This may allow the mobile terminal to have a simple appearance. The antenna device may be also used as a stylus for manipulating the touch screen. Accordingly, various utilization examples may be implemented.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain is additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a terminal body having a touch screen; and
an audio jack provided on the terminal body, the audio jack configured to connect with an audio output device or an antenna device when the audio output device or the antenna device is alternatively coupled to the audio jack;
wherein the antenna device includes:
an antenna body,
a connector provided at one end of the antenna body being prepared for insertion into the audio jack, the connector including at least one feeding terminal to transmit or receive a radio signal, and
a touch tip provided at the connector, and the touch tip configured to manipulate the touch screen, and
wherein the audio jack includes:
a signal terminal to transmit the radio signal to the audio output device or to receive the radio signal from the audio output device when the audio output device is coupled to the audio jack, and
a ground terminal to transmit the radio signal to the antenna device or to receive the radio signal from the antenna device when the antenna device is coupled to the audio jack, and
wherein the connector includes an insulator configured to insulate part of the connector for preventing an electrical connection to the signal terminal.

2. The mobile terminal of claim 1, wherein the terminal body includes a recognition device to determine whether a connector of the audio output device is electrically connected to the audio jack and to determine whether the connector of the antenna device is electrically connected to the audio jack.

3. The mobile terminal of claim 2, wherein the touch screen provides a user interface to inquire whether to output a received broadcast image, when the connector of the antenna device has been inserted into the audio jack.

4. The mobile terminal of claim 2, wherein the audio jack further includes a microphone (MIC) terminal,
wherein the feeding terminal of the connector is connected to the ground terminal when the antenna device is coupled to the audio jack.

5. The mobile terminal of claim 4, wherein the recognition device includes:
a first comparator to output a first comparison value indicating a resultant value obtained by comparing a first preset voltage with a voltage of the MIC terminal; and
a second comparator to output a second comparison value indicating a resultant value obtained by comparing a second preset voltage with the voltage of the MIC terminal, wherein the second preset voltage value is higher than the first preset voltage,
wherein the recognition device determines whether the connector of the audio output device is electrically connected to the audio jack or whether the connector of the antenna device is electrically connected to the audio jack based on the first comparison value and the second comparison value and based on a preset list.

6. The mobile terminal of claim 5, wherein the first preset voltage is lower than a voltage when a microphone is normally operated, and the first preset is connected to a positive (+) input terminal of the first comparator,
wherein the second preset voltage is higher than the voltage when the microphone is normally operated, and the second preset voltage is connected to a positive (+) input terminal of the second comparator.

7. The mobile terminal of claim 4, wherein the connector is formed to correspond to a size of the audio jack,
wherein the connector includes:
a first connector body formed of a conductive material and being connected to the antenna body by a hinge;
a second connector body formed of a conductive material, the second connector body being provided at a head portion of the first connector body so as to electrically connect to the first connector body, and the second connector body is configured to form the feeding terminal; and
a third connector body formed of a conductive material, the third connector body being provided at a head portion of the second connector body so as to be insulated from the second connector body, and the third connector body having a mounting hole at an end thereof to receive the touch tip.

8. The mobile terminal of claim 7, wherein the connector further includes a first insulator provided on an outer circumferential surface of the second connector body to contact the MIC terminal when the antenna device is provided in the audio jack.

9. The mobile terminal of claim 8, wherein the connector further includes a second insulator provided between the second connector body and the third connector body to insulate the second connector body and the third connector body from each other.

10. The mobile terminal of claim 8, wherein a length of the third connector body is long enough to contact both a left signal terminal and a right signal terminal when the antenna device is coupled to the audio jack.

11. The mobile terminal of claim 1, further comprising an audio output module mounted at the terminal body,
wherein the audio output module is configured to automatically limit sound output when the audio output device is inserted into the audio jack.

12. A mobile terminal comprising:
a terminal body having a touch screen;
an audio jack on the terminal body to electrically connect to an audio device, the audio jack including a plurality of terminals;
an antenna device to wireless receive a broadcast signal, the antenna device including an antenna body, a plurality of telescopic rods to extend from the antenna body, a connector having a plurality of feeding terminals to electrically contact the audio jack when the antenna device is separately electrically connected to the audio jack, and a touch tip coupled to the connector to provide a user input via the touch screen when the antenna device is electrically disconnected from the audio jack; and
a recognition device to determine whether the audio device is electrically connected to the audio jack and to determine whether the antenna device is electrically connected to the audio jack, wherein the audio jack provides an audio signal to the audio device when the audio device is electrically connected to the audio jack, and the audio jack to receive the broadcast signal from the antenna device when the antenna device is electrically connected to the audio jack,
wherein the recognition device includes:
a first comparator to output a first comparison value based on a comparison of a first preset voltage and a voltage at a first one of the terminals of the audio jack, and
a second comparator to output a second comparison value based on a comparison of a second preset voltage and the voltage at the first one of the terminals of the audio jack, wherein the second preset voltage value is higher than the first preset voltage,
wherein the recognition device determines whether the audio device is electrically connected to the audio jack and determines whether the antenna device is electrically connected to the audio jack based on the first comparison value and the second comparison value.

13. The mobile terminal of claim 12, wherein the connector includes:
a first connector body formed of a conductive material;
a hinge device to couple the antenna body to the first connector body;
a second connector body formed of a conductive material, the second connector body provided at a head portion of the first connector body to electrically connect to the first connector body; and
a third connector body formed of a conductive material, the third connector body provided at a head portion of the second connector body so as to be insulated from the second connector body, and the third connector body having a mounting hole to receive the touch tip.

14. The mobile terminal of claim 13, wherein a first one of the terminals of the audio jack is a microphone (MIC) terminal, a second one of the terminals of the audio jack is a ground terminal, and the third one of the terminals of the audio jack is a left signal terminal or a right signal terminal.

15. The mobile terminal of claim 14, wherein the second one of the terminals of the audio jack to electrically connect to the second connector body when the connector is coupled to the audio jack.

16. The mobile terminal of claim 15, wherein the first connector body is not electrically connected to the first one of the terminals of the audio jack when the connector of the antenna device is coupled to the audio jack, and the third connector body is not electrically connected to the third one of the terminals of the audio jack when the connector of the antenna device is coupled to the audio jack.

17. The mobile terminal of claim 13, wherein the connector further includes a first insulator provided on an outer surface of the second connector body to contact the first one of the terminals when the connector is coupled to the audio jack.

18. The mobile terminal of claim 17, wherein the connector further includes a second insulator provided between the second connector body and the third connector body to insulate the second connector body and the third connector body from each other.

19. A mobile terminal, comprising:
- a terminal body having a touch screen; and
- an audio jack provided at the terminal body, the audio jack to electrically couple to an audio output device when the audio output device is received in the audio jack, and the audio jack to electrically couple to an antenna device when the antenna device is received in the audio jack;
- wherein the antenna device includes:
  - an antenna body,
  - a connector at an end of the antenna body to insert into the audio jack, the connector having a feeding terminal to transmit a radio signal or to receive a radio signal, and
  - a touch tip at the connector to manipulate the touch screen, and
- wherein the audio jack includes:
  - a signal terminal to provide the radio signal to the audio output device when the audio output device is electrically coupled to the audio jack, and
  - a ground terminal to receive the radio signal from the antenna device when the antenna device is electrically coupled to the audio jack,
  - wherein the connector includes an insulator configured to insulate part of the connector and prevent an electrical connection to the signal terminal.

20. The mobile terminal of claim 19, further comprising a recognition device to determine whether a connector of the audio output device is electrically coupled to the audio jack and to determine whether the connector of the antenna device is electrically coupled to the audio jack.

21. The mobile terminal of claim 20, wherein the recognition device includes:
- a first comparator to output a first comparison value indicating a resultant value obtained by comparing a first preset voltage with a voltage of a microphone (MIC) terminal; and
- a second comparator to output a second comparison value indicating a resultant value obtained by comparing a second preset voltage with the voltage of the MIC terminal, wherein the second preset voltage value is higher than the first preset voltage,
- wherein the recognition device determines whether the connector of the audio output device is electrically coupled to the audio jack or whether the connector of the antenna device is electrically coupled to the audio jack based on the first comparison value and the second comparison value and based on a preset list.

* * * * *